United States Patent Office 2,987,930
Patented June 13, 1961

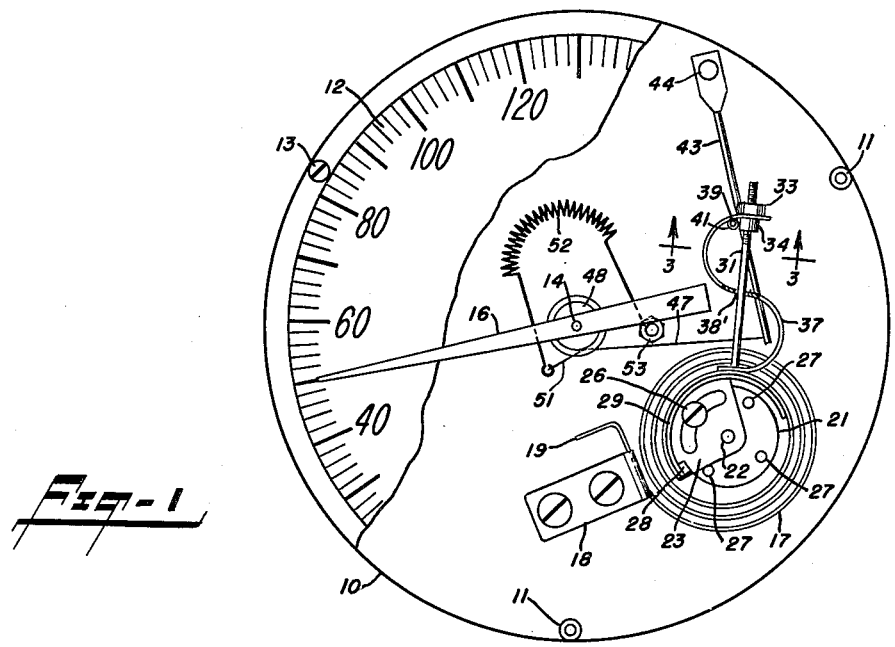
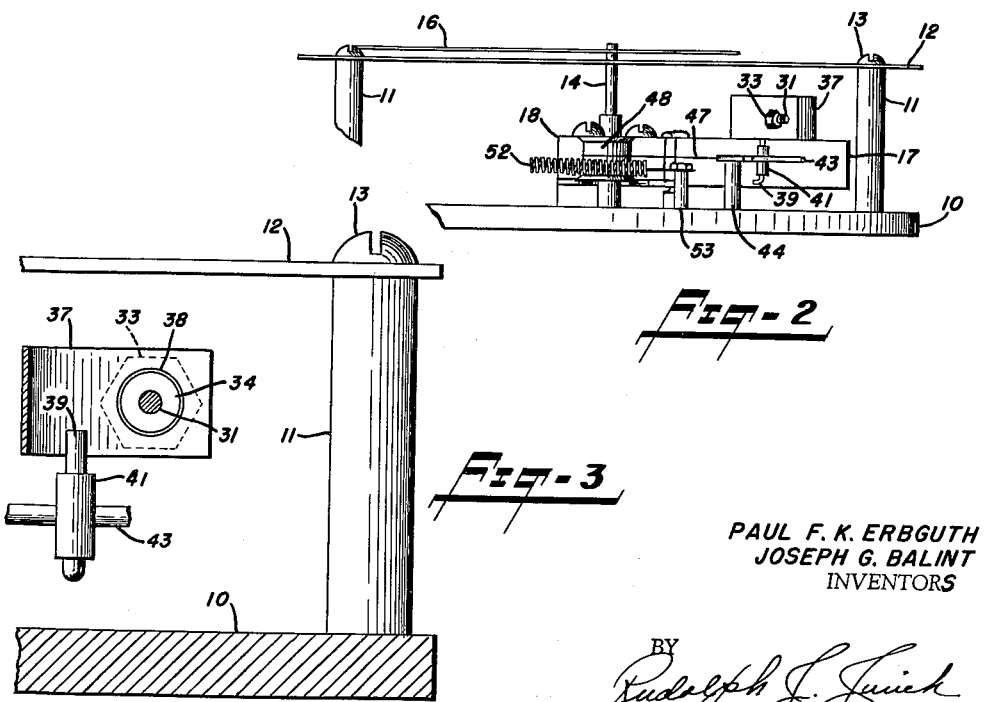
PAUL F. K. ERBGUTH
JOSEPH G. BALINT
INVENTORS

2,987,930
MEASURING INSTRUMENT
Paul F. K. Erbguth, Great Neck, N.Y., and Joseph G. Balint, Union, N.J., assignors to Daystrom, Incorporated, Murray Hill, N.J., a corporation of New Jersey
Filed Nov. 28, 1958, Ser. No. 776,842
5 Claims. (Cl. 74—95)

This invention relates to an instrument of the type in which an element responsive to a variable condition is adapted to move a second element, and more particularly to a novel connecting linkage between such elements.

Our novel connecting linkage may be used in instruments which include an element responsive to temperature, pressure or other condition, which element is connected through the novel connecting linkage to a pointer, recording and/or controlling element, or the like. The connecting linkage is of particular use in long scale instruments having an actuating element comprising a Bourdon tube helix, or other actuating element, having a relatively small movement over the range of conditions to which the instrument is responsive. The connecting linkage of our invention amplifies the relatively small movement of the actuating element to drive a pointer over a long scale. Although the linkage of our invention is shown and described hereinbelow as embodied in a long scale dial-type pressure gauge, it is not limited to such use.

Prior art linkage arrangements are, in general, complicated to manufacture and difficult to assemble. Often, such prior art arrangements employ a gear rack and pinion drive of high gear ratio. Such arrangements frequently include a hair spring on the pinion staff as an anti-backlash device, which develops higher forces at the greater deflection thereby resulting in high bearing and gear load, and thus friction and hysteresis. The connecting linkage of our invention includes no gearing, and is light in weight. The friction is low, which results in low hysteresis and a smooth, positive action. This combination of light parts utilized therein, and the absence of gears, results in a shock and vibration resistant arrangement. Calibration is simple, and the cost low.

An object of this invention is the provision of a connecting linkage which is economically manufactured and easily installed in an instrument.

An object of this invention is the provision of a connecting linkage between an actuating element and a second element which linkage has low friction and low hysteresis whereby the action is smooth and positive.

An object of this invention is the provision of a light weight connecting linkage which is vibration and shock resistant.

An object of this invention is the provision of a connecting linkage between an actuating element and a pivotably mounted second element, which linkage comprises a shaft connected to the second element, constant force means tending to rotate the shaft in one shaft direction, and means connecting the shaft to the said actuating element whereby the shaft is positively rotated in the other shaft direction upon rotation of the actuating element in a first direction, the said shaft being rotated in the one shaft direction by rotation of the said actuating element in a second direction.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views:

FIGURE 1 is a front view of a dial-type pressure indicating instrument embodying the connecting linkage of our invention, the instrument being shown removed from the case, and parts being shown broken away for clarity;

FIGURE 2 is a top view of the instrument of FIGURE 1; and

FIGURE 3 is an enlarged fragmentary sectional view taken on line 3—3 of FIGURE 1.

Referring to the drawings, the instrument shown comprises a base 10 having a plurality of studs 11 extending therefrom, to the ends of which studs a scale plate 12 is attached by screws 13. A rotatable staff 14 extends through a hole in the scale plate, and has affixed thereto a pointer 16 movable over suitable indicia on the scale plate. A suitable instrument case and cover, not shown, houses the instrument mechanism.

The pointer 16 is connected through our novel connecting linkage to an actuating, or measuring, element which is responsive to the value of the condition being measured. The actuating element shown in the drawings comprises a pressure responsive Bourdon tube 17 supported at its outer end by a mounting clamp 18 suitably secured to the base 10. The Bourdon tube is connected through the tube 19 to a pressure source to be measured. It will here be noted that the instruments employing our connecting linkage are not limited to pressure measuring devices. Temperature values may be measured, for example, by connecting a suitable Bourdon tube to a temperature responsive bulb. Further, the actuating element need not be a Bourdon tube since coiled bimetallic elements for the measurement of temperature, for example, may be used.

A plate 21, which is adapted for pivotal movement about a pin 22 extending from the base 10, is attached to the inner end of the Bourdon tube. A sector plate 23, having an elongated circumferential slot 24 formed therein, is adjustably mounted on the plate 21 by the screw 26 which engages one of the threaded holes 27 in the plate 21. The sector plate 23 is provided with a forwardly extending lug 28 to which a bimetallic temperature compensating element 29 is suitably secured.

An arm 31 is suitably attached to the bimetallic element 29. An adjusting nut 33, having a cylindrical collar 34 formed thereon, engages the threaded free end of the arm 31. A compression spring 37 is mounted on the arm 31 between the bimetallic element 13 and the adjusting nut 33 and provides a biasing force on the nut preventing undesired rotation thereof. The spring shown is of an S-shape which includes through holes 38 and 38' adjacent the end and center thereof, respectively. The arm 31 extends through the center hole while the collar 34 and arm 31 extend through the hole 38 adjacent the outer free end of the spring. A rearwardly extending bearing pin supporting bracket 39 is attached to the spring 37 by welding, or any other suitable means, and supports a tubular bearing member, or pin 41, of plastic, or other suitable material. The free end of the bracket 39 is bent (as seen in FIGURE 2) to retain the bearing pin thereon.

An arm 43 is pivotably mounted adjacent one end thereof on a post 44 extending from the instrument base, which arm engages the bearing member 41 on the bracket 39, intermediate the ends of the arm. The free end of the arm 43 is connected to a flexible beryllium-copper ribbon 47, or the like. The ribbon 47 connects to a pointer pulley 48 secured to the pointer staff 14. A similar flexible ribbon 51, wound on the pointer pulley 48 in the opposite direction from the ribbon 47, connects the pointer pulley 48 to the free end of a constant force spring 52 which spring is mounted adjacent the opposite end thereof on a post 53, extending from the base 10, by a nut 54 threadedly engaging the threaded end of the post.

The spring 52, sold under the trademark "Flexator," provides a constant tensile force on the ribbon 51 which tends to turn the pointer staff 14 in a clockwise direction, as viewed in FIGURE 1. In addition, the resultant force on the ribbon 47 connected to the pulley 48 keeps the ribbon 47 taut and the lever arm 43 in movable contact with the bearing member 41. The taut ribbon 47 tends to rotate the arm 43 in a clockwise direction; rotation of the arm 43 being restrained by the bearing member 41 extending from the spring 37 on the arm 31.

In operation, as the pressure to which the Bourdon tube 17 is subjected increases, the spiral will move the arm 31 in a counter-clockwise direction, as viewed in FIGURE 1. As the arm 31 rotates, the arm 43 is caused by the constant force spring 52 to turn in a clockwise direction. Consequently, the pulley 42 and attached pointer 16 turns in a clockwise direction. When the pressure decreases, the Bourdon tube 17 moves the arm 31 in a clockwise direction, which causes the arm 43 to move in a counter-clockwise direction. The resulting force on the ribbon 47 rotates the pulley and attached pointer 16 counter-clockwise, against the constant force of the spring 52 on the ribbon 51.

An important feature of our invention resides in the exceedingly simple and easily accessible means of calibrating, or adjusting, the instrument. It will be noted that the position of the bearing member 41 secured to the spring 37 is adjustable longitudinally of the arm 31 by simply turning the adjusting screw 33. In this manner, the effective length of the arm 31 is easily adjusted. Magnification, or amplification, of the relatively small movement of the Bourdon tube is increased by turning the adjusting screw 33 out toward the free end of the arm 31, and is decreased by turning the adjusting screw in the other direction. As mentioned above, the spring 37 also functions to maintain a longitudinally directed biasing force on the adjusting nut 33 to prevent undesired rotation thereof from vibration, and the like.

Advantages of our connecting linkage over prior art arrangements include: the weight of the essential elements is less than prior art arrangements whereby the instrument is more resistant to shock; the action of the movement is positive and hysteresis is reduced to a minimum; and calibration is simple.

Having now described our invention in detail, in accordance with the patent statutes, various changes and modifications will suggest themselves to those skilled in this art. It is intended that such changes and modifications shall fall within the spirit and scope of the invention as recited in the following claims.

We claim:

1. A linkage for connecting a first element, rotatable in accordance with variations in a condition, to a second element, the said linkage including a shaft connected to the second element, constant force means tending to rotate the shaft in one shaft direction, and means including an arm mounted to pivot about a fixed axis, movable by slidable engagement with respect to said first element, and connecting the shaft to the said first element, whereby the shaft is positively rotated in the other shaft direction upon rotation of the first element in a first direction, the said shaft being rotated in the one shaft direction when the said first element rotates in a second direction.

2. The invention as recited in claim 1 wherein the said means connecting the shaft to the first element includes a first arm attached to the first rotatable element and rotatable therewith, a bearing pin adjustably positioned longitudinally of the first arm, and the arm mounted to pivot about a fixed axis is biased into engagement with the said bearing pin by the said constant force means.

3. The invention as recited in claim 2 including a compression spring mounted on the said first arm, the bearing pin being attached to the said spring, and means adjusting the spring compression whereby the bearing pin is adjustably positioned longitudinally of the said first arm.

4. A linkage for connecting a first element rotatable in accordance with variations in a condition to a second element, the said linkage including a shaft connected to the second element, means tending to rotate the shaft in one direction, a first arm attached to the first element, a second arm mounted to oscillate about a fixed axis, a bearing member attached to one of the said arms and adjustably positioned longitudinally thereof, the said bearing member slidably engaging the other of said arms, and flexible means connecting the second arm to the said shaft for rotating it in the other direction.

5. In an indicating instrument, linkage for transmitting movements of an actuating element rotatable about a first fixed axis to an indicating element rotatable about a second fixed axis substantially parallel with the said first axis, the said linkage including a first arm radially extending from the actuating element, a bearing member attached to the said first arm and adjustably positioned longitudinally thereof, the said bearing member having an axis extending substantially parallel to the said first axis, a second arm rotatable about a third fixed axis substantially parallel with the said first axis, a shaft on which said indicating element is mounted for rotation about the said second axis, a flexible ribbon connecting the free end of the said second arm to the said shaft, and means tending to rotate the shaft in a direction to maintain the ribbon taut and the second arm in slidable contact with the said bearing member.

References Cited in the file of this patent

UNITED STATES PATENTS

| | | |
|---|---|---|
| 1,444,098 | Berry | Feb. 6, 1923 |
| 1,444,099 | Berry | Feb. 6, 1923 |
| 1,993,637 | Wardenburg | Mar. 5, 1935 |
| 2,387,909 | Ingham | Oct. 30, 1945 |
| 2,630,316 | Foster | Mar. 3, 1953 |

FOREIGN PATENTS

| | | |
|---|---|---|
| 1,106,317 | France | May 29, 1954 |
| 787,611 | Great Britain | Dec. 11, 1957 |